United States Patent [19]

Garnett

[11] Patent Number: 5,356,036

[45] Date of Patent: Oct. 18, 1994

[54] CHEMICAL SUPPLY DEVICE FOR CHEMICAL HANDLING SYSTEM, AND FITMENTS THEREFOR

[75] Inventor: Richard H. Garnett, Hereford, United Kingdom

[73] Assignee: Wisdom Agricultural Limited, Fownhope, England

[21] Appl. No.: 598,736

[22] PCT Filed: May 2, 1989

[86] PCT No.: PCT/GB89/00500

§ 371 Date: Oct. 23, 1990

§ 102(e) Date: Oct. 23, 1990

[87] PCT Pub. No.: WO89/11219

PCT Pub. Date: Nov. 30, 1989

[30] Foreign Application Priority Data

May 21, 1988 [GB] United Kingdom ............... 8812047

[51] Int. Cl.[5] .......................................... B67D 5/00
[52] U.S. Cl. ................................. 222/83.5; 222/89; 222/327; 222/386; 222/630
[58] Field of Search .............. 222/82, 89, 326, 327, 222/386, 630, 83.5; 137/889, 892, 895; 239/112, 309, 310, 313

[56] References Cited

U.S. PATENT DOCUMENTS

| | | | |
|---|---|---|---|
| 2,123,712 | 7/1938 | Clark | 222/326 X |
| 2,127,731 | 8/1938 | Hayes | 239/310 |
| 2,176,635 | 10/1939 | Mattson | 226/120 |
| 2,257,725 | 10/1941 | Davis | 222/82 |
| 2,258,636 | 10/1941 | Young et al. | 222/83.5 X |
| 2,753,080 | 7/1956 | Bartlett | 222/89 X |
| 2,901,182 | 8/1959 | Cragg et al. | 239/129 |
| 3,159,311 | 12/1964 | Fowler | 222/83.5 X |
| 3,727,640 | 4/1973 | Sargeant | 136/889 |
| 4,092,993 | 6/1978 | Stevenson | 137/15 |
| 4,119,114 | 10/1978 | Bolton et al. | 137/318 |
| 4,171,710 | 10/1979 | Boynton et al. | 136/238 |
| 4,195,672 | 4/1980 | Freeman | 141/91 |
| 4,254,805 | 3/1981 | Reeder | 141/59 |
| 4,545,535 | 10/1985 | Knapp | 239/313 |
| 4,582,223 | 4/1986 | Kobe | 222/82 |
| 4,664,299 | 5/1987 | Goncalves | 222/327 |
| 4,673,006 | 6/1987 | Speck | 141/1 |
| 4,694,850 | 9/1987 | Fumino | 222/82 X |
| 4,767,058 | 8/1988 | LaRosa et al. | 239/309 |
| 4,793,476 | 12/1988 | Schrupp | 206/222 |
| 4,901,890 | 2/1990 | Mivelaz | 239/310 X |
| 5,071,035 | 12/1991 | Kiplinger | 222/83.5 |

FOREIGN PATENT DOCUMENTS

| | | | |
|---|---|---|---|
| 720270 | 10/1965 | Canada | 222/82 |
| 0122514 | 10/1984 | European Pat. Off. | |
| 653339 | 12/1937 | Fed. Rep. of Germany | |
| 74371 | 10/1977 | Luxembourg | |
| 2216817 | 10/1989 | United Kingdom | |

OTHER PUBLICATIONS

"Closed Chemical Transfer Systems", Divisional Note from AFRC Institute of Engineering Research, No. DN.1448, Jan. 1988, by A. R. Frost et al., pp. 1-34.
"Sprayers: Design for the Future", *Power Farming*, vol. 68, No. 2, Aug., 1988, by P. Howard, p. 31.

*Primary Examiner*—Andres Kashnikow
*Assistant Examiner*—Joseph A. Kaufman
*Attorney, Agent, or Firm*—Young & Thompson

[57] ABSTRACT

A chemical concentrate metering device 16 is provided for an agricultural or horticultural or forestry sprayer system including a reservoir 2 for supplying a dilutant and a spray head 10 for spraying a mixture of the dilutant and a chemical concentrate. The metering device 16 comprises a conduit 17 having an inlet 18 for receiving dilutant from the system and an outlet 19 for supplying a mixture of the dilutant and a chemical concentrate to the system. In addition a seating 22 is provided for detachably receiving a receptacle 31 for supplying chemical concentrate and an injection orifice 26 opens into the conduit 17 and communicates with an outlet 35 of the receptacle 31 received in the seating 22 so as to enable chemical concentrate to be injected from the receptacle 31 into a flow of dilutant in the conduit 17. This enables the chemical concentrate to be supplied directly to the spray head or to an intervening storage tank prior to supply to the spray head, without risk of the user being contaminated by the chemical concentrate.

8 Claims, 4 Drawing Sheets

CHEMICAL SUPPLY DEVICE FOR CHEMICAL HANDLING SYSTEM, AND FITMENTS THEREFOR

BACKGROUND OF THE INVENTION

This invention relates to chemical supply devices for chemical handling systems, such as agricultural or horticultural or forestry sprayer systems, and to chemical containers for attachment to such devices.

Agricultural or horticultural or forestry sprayer systems are commonly of a type which includes a reservoir for supplying a dilutant and a spray head for spraying a mixture of the dilutant and a chemical concentrate. The chemical concentrate is supplied in a container and requires to be diluted with a dilutant, generally water, prior to use, the container being subsequently rinsed out with the dilutant. This diluting operation is commonly performed manually, but this is unsatisfactory because of the risk of chemical concentrate being spilled and the danger of the user coming into contact with the concentrate, and also because of the difficulty in accurately measuring the concentration of the chemical in the solution.

The requirements for minimizing the risk of chemical contamination, for ensuring accurate metering and for rinsing of containers are embodied in Great Britain in the Food and Environment Protection Act 1985, the Pesticides Regulations 1986, the applicable Codes of Practice and recommendations from the Health and Safety Executive (C.O.S. H.H. regulations), and in similar codes in other countries.

SUMMARY AND OBJECTS OF THE INVENTION

It is an object of the invention to enable handling of chemical concentrate with or without dilutant with accuracy and safety.

According to one aspect of the present invention, there is provided a chemical container for attachment to a chemical supply device for a chemical handling system, the supply device including a conduit for supplying a quantity of chemical to the system, characterised in that the chemical container comprises a cylindrical casing for containing a quantity of chemical adapted at one end to be detachably received in a seating of the supply device and having an outlet at said one end positioned so that, when the casing is received in the seating, the outlet is in communication with an injection orifice opening into the conduit of the supply device, and an actuator which is actuable to force a quantity of chemical from within the casing through the outlet into the conduit by way of the injection orifice.

The chemical container will generally be supplied ready filled with chemical concentrated and is attachable to the supply device for direct injection of chemical concentrate into the conduit. However it is also within the scope of the invention for the container to be filled with chemical concentrate only after attachment to the supply device.

It is preferred that the actuator comprises a plunger which is displaceable to move a piston axially within the casing. The plunger may be detachable from the container.

Conveniently the casing has a bayonet connector at said one end for engaging a complementary formation on the seating.

According to another aspect of the present invention, there is provided a chemical supply device for a chemical handling system, wherein the supply device includes a conduit for supplying a quantity of chemical to the system, characterised in that the supply device also includes an injection orifice opening into the conduit, and a seating for detachably receiving a receptacle from which a quantity of chemical is to be supplied to the system, a duct placing the inside of the receptacle in one-way communication with the injection orifice when the receptacle is received in the seating so as to enable a quantity of chemical to be injected from the receptacle into the conduit by way of the injection orifice, and a rinsing pipe opening into the duct so as to enable rinsing fluid to be supplied to the receptacle by way of the rinsing pipe and the duct.

The use of such a supply device in a sprayer system enables chemical concentrate to be injected directly from the receptacle into a flow of dilutant so that the resulting mixture of the dilutant and the chemical concentrate may be supplied directly to the spray head or to an intervening storage tank prior to supply to the spray head, without risk of the user being contaminated by the chemical concentrate.

The receptacle may be the container in which the chemical concentrate is supplied. Alternatively the device may include supply means by means of which a quantity of chemical may be supplied from a chemical container to the receptacle by way of the duct prior to injection from the receptacle into the conduit.

In a particularly advantageous embodiment of the invention, the conduit has an inlet for receiving dilutant from the system and an outlet for supplying a mixture of the dilutant and the supplied chemical to the system, and the rinsing pipe is connected to enable flow of dilutant from the conduit into the receptacle for rinsing out the receptacle. The resultant mixture of the dilutant and chemical may then flow from the receptacle into the conduit.

The conduit may incorporate a venturi to enable the flow of dilutant to exert some scavenging effect on the chemical in the injection orifice.

Where the receptacle is the chemical container itself, the container is generally supplied with its outlet closed off by a seal, in which case the duct may be adapted to pierce the seal to place the inside of the container in communication with the injection orifice.

The seating may incorporate a dry break coupling for engaging a complementary formation on the receptacle.

The invention also provides a chemical supply cap for attachment to the outlet of a chemical container to permit supply of a quantity of chemical from within the container to a supply pipe with the container inverted so that the outlet is at its bottom, characterised in that the cap includes an outlet conduit for supply of chemical when the container is inverted and a valved inlet conduit for the passage of air into the container during supply of chemical through the outlet conduit, the valve including a valve member displaceable with respect to a seat within the inlet conduit and adapted to be lifted by air pressure during chemical supply through the outlet conduit to permit air to enter the container.

BRIEF DESCRIPTION OF THE DRAWINGS

In order that the invention may be more fully understood, reference will now be made, by way of example, with reference to the accompanying drawings, in which.

DETAILED DESCRIPTION OF THE DRAWINGS

Figure 1:
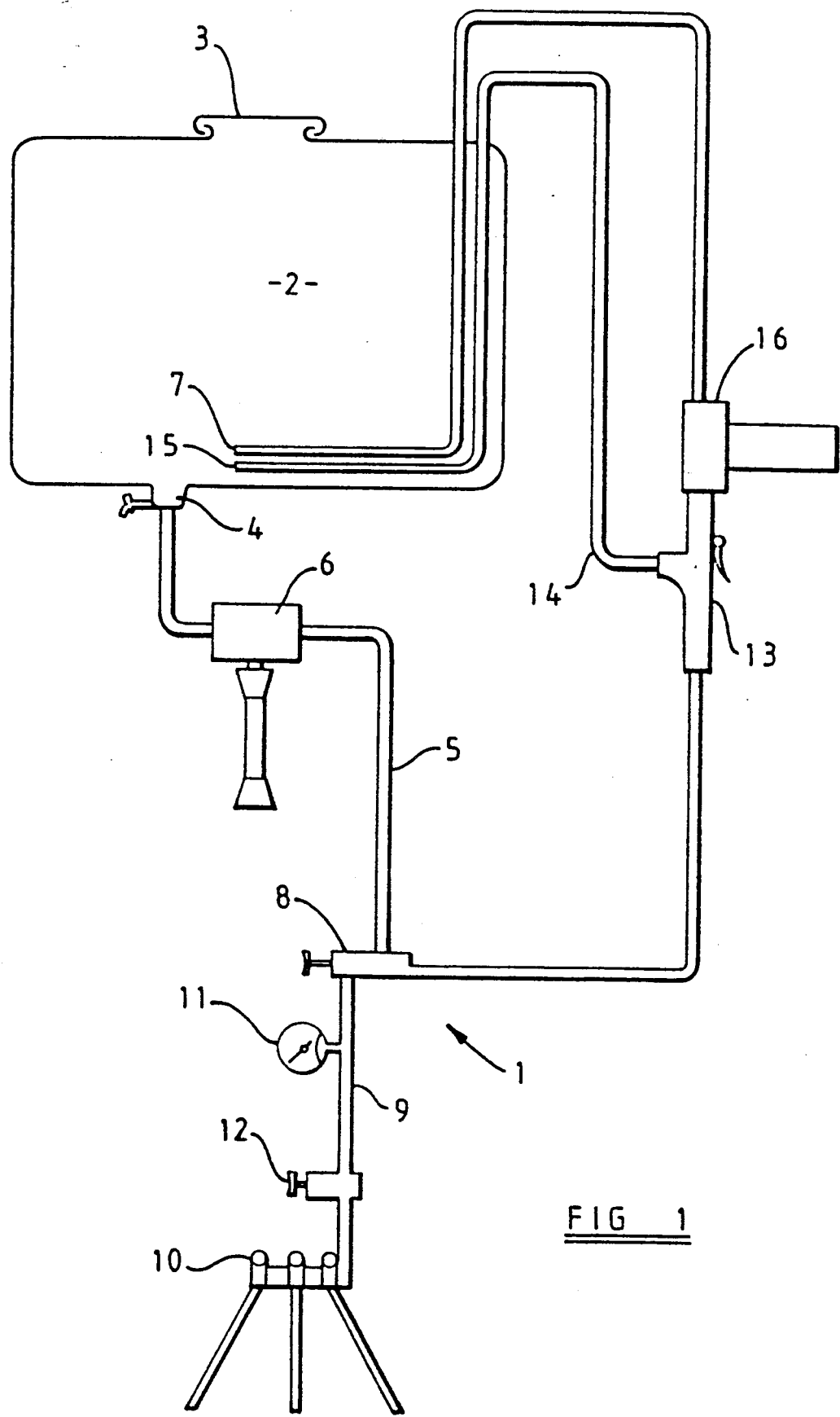
FIG. 1 is a diagrammatic representation of an agricultural sprayer system in accordance with the invention.

Referring to FIG. 1, the agricultural sprayer system 1 comprises a reservoir 2 having a removable cap 3 and an outlet 4 connected to a flow line 5 incorporating a pump 6. The flow line 5 forms a circulating loop which returns solution to the reservoir 2 by way of an inlet 7. Furthermore the flow line 5 incorporates a diverter valve 8 by means of which solution from the flow line 5 is supplied to an output line 9 and hence to a spray head 10. The output line 9 incorporates a pressure gauge 11 and a shutoff valve 12. In addition the flow line 5 incorporates a diverter 13 by means of which a proportion of the solution flow is returned to the reservoir 2 by way of a return line 14 and an inlet 15, and a chemical concentrate metering device 16 which will be described in further detail with reference to FIG. 2.

The metering device 16 is provided for introducing a measured quantity of chemical concentrate into a proportion of the circulating solution as determined by the diverter 13 to be further described with reference to FIG. 3 below. The resulting mixture is fed back to the reservoir 2 by way of the inlet 7 where the solution is stored, and possibly further mixed and agitated.

Figure 2:
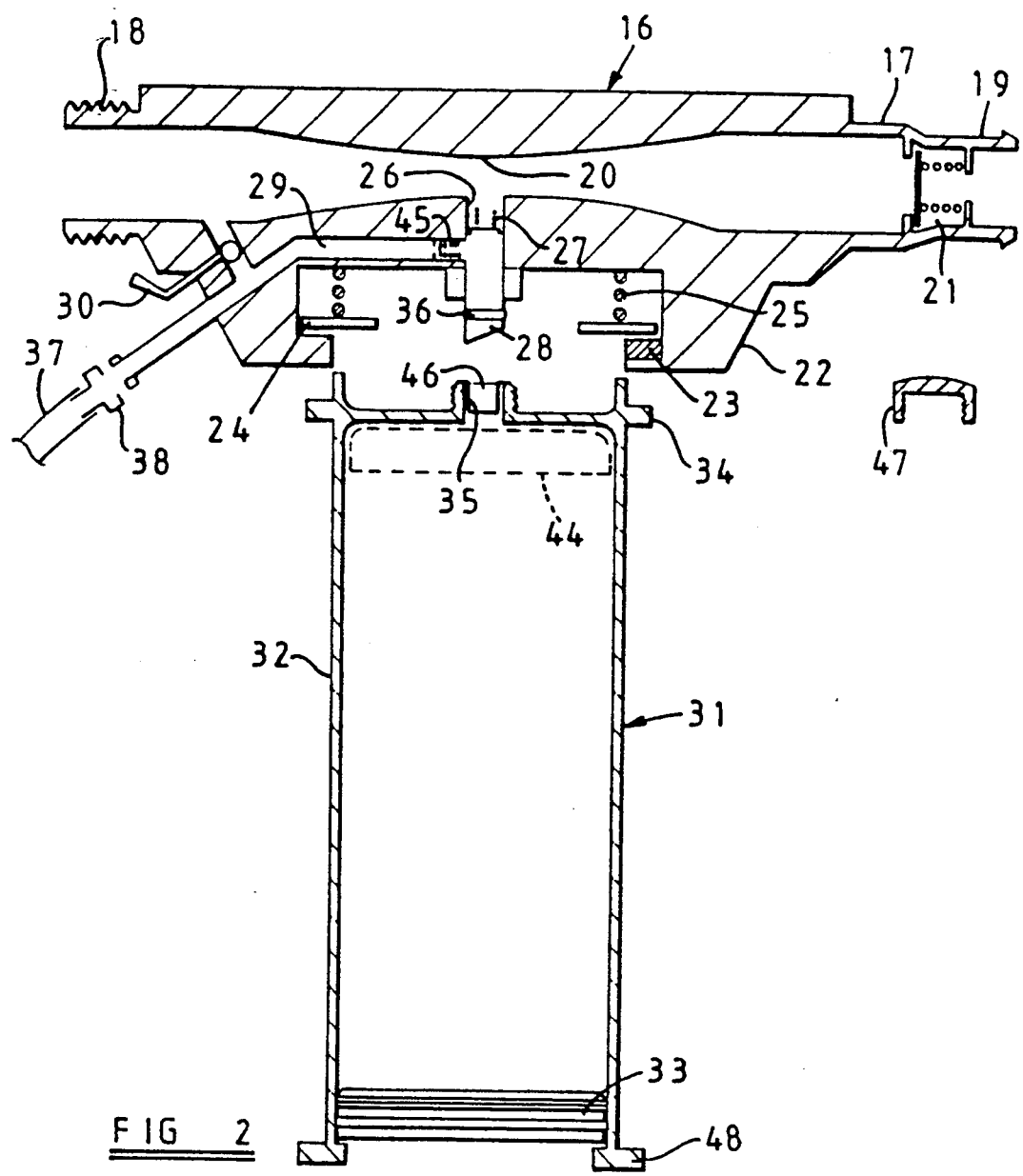
FIG. 2 is a section through a chemical concentrate metering device and a chemical concentrate container in accordance with the invention.

Referring to FIG. 2, the chemical concentrate metering device 16 comprises a conduit 17 having a screwthreaded inlet 18 and an outlet 19 for solution circulating in the flow line 5. The conduit 17 includes a venturi 20 and a non-return valve 21. In addition the metering device 16 has a seating 22 formed integrally with the conduit 17 and incorporating a bayonet connector 23 having an annular washer 24 and a spring 25. An injection orifice 26 incorporating a non-return valve 27 opens into the conduit 17 in the vicinity of the venturi 20 and is in communication with a short duct 28 within the seating 22. The injection orifice 26 also communicates with a pipe 29 which is communicable with the conduit 17 upstream of the venturi 20 by means of a tap 30.

The metering device 16 may be used in different modes as will be apparent from the following description. In a first mode an injection pump 31 having a cylindrical casing 32 and a piston 33 is received within the seating 22 by engagement of pins 34 at one end of the casing 32 with the bayonet connector 23 of the seating 22. Although the injection pump 31 is shown in FIG. 2 detached from the seating 22, it will be apparent that the bayonet connection between the casing 32 and the seating 22 is established simply by introducing the pins 34 into the connector 23 so as to depress the washer 24 and the spring 25 and rotating the pins 34 within the connector 23. During this fitting operation the duct 28 will be introduced into an outlet 35 of the injection pump 31 and be sealed therein by means of O-rings 36. The inside of the casing 32 will thereby be placed in communication with the injection orifice 26 by way of the non-return valve 27. Furthermore the piston 33 is displaceable by means of a plunger (not shown in FIG. 2, but described further below) so as to inject liquid from the inside of the casing 32 into the inside of the conduit 17.

Figure 4:
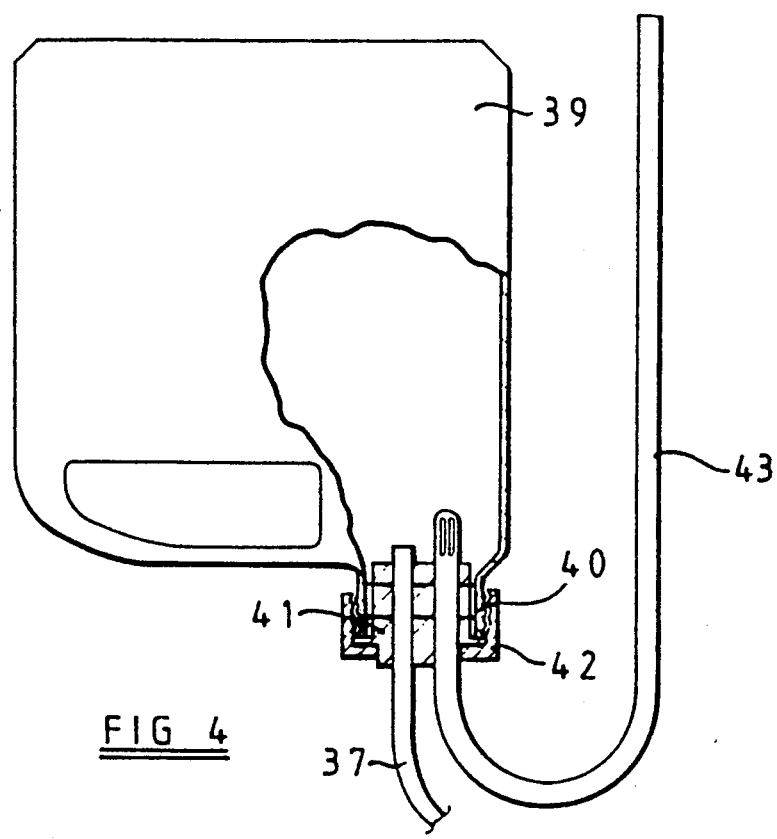
FIG. 4 is a partial section through a part of a metering device in accordance with the invention.

Furthermore, in this mode, a chemical concentrate container (not shown in FIG. 2) is connected to the pipe 29 by means of a flexible hose 37 and a dry break coupling 38. A conventional chemical concentrate container 39 is shown in FIG. 4 connected to the flexible hose 37 and inverted. The container 39 has a screwthreaded outlet 40 and is shown broken away in the vicinity of the outlet 40 to illustrate the manner in which the outlet 40 is connected to the flexible hose 37 by means of a bung 41 and a screwthreaded cap 42. A container pressure balance tube 43 extends through the bung 41 to permit air to enter the inside of the container 39.

In operation, the piston 33 is drawn back from the position shown in broken lines 44 in FIG. 2 to the position shown in solid lines in FIG. 2, or to some intermediate position, to withdraw chemical concentrate from the container 39 along the hose 37 and the pipe 29 into the inside of the casing 32. The piston 33 is then depressed inwardly to force chemical concentrate from the inside of the casing 32 into the conduit 17 by way of the injection orifice 26 and to cause the chemical concentrate to mix with the solution circulating in the flow line 5. Flow of chemical concentrate back into the pipe 29 during this injection operation is prevented by a non-return valve 45. This operation may be repeated as required to dispense the required quantity of chemical concentrate.

Furthermore, if it is subsequently required to rinse out any chemical concentrate remaining in the injection pump 31 and the container 39, the container 39 is placed upright and the tap 30 is opened. The piston 33 is then again pulled back within the casing 32 so that solution is drawn from the conduit 17 into the pipe 29 and hence into the inside of the casing 32 and the container 39 where it mixes with the residue of the chemical concentrate. The resulting mixture of solution and chemical concentrate is returned to the conduit 17 by operating the piston 31 with the tap 30 closed.

Under certain circumstances it might also be convenient to provide a tap (not shown), similar to the tap 30, in the vicinity of the injection orifice 26 to permit direct supply of chemical concentrate from the container by way of the pipe 29 and the injection orifice 26 to the conduit 17, without passing through the casing 32, when the tap is in a first position. The contents of one or more complete containers may be emptied into the conduit 17 with the tap in this position, and the tap may then be moved to a second position to permit a part of the contents of a further container to be supplied to the conduit 17 whilst being metered by way of the casing 32.

In an alternative mode, the metering device 16 is used with a specially adapted chemical concentrate container in place of the injection pump 31, the dry break coupling 38 being closed off by a cap (not shown). The specially adapted chemical concentrate container is of substantially the same form as the injection pump 31 and is therefore not separately shown in FIG. 2. The container 31 is supplied ready filled with chemical concentrate and with its outlet 35 closed off by a seal 46 and a detachable screwthreaded cap 47 (shown removed in FIG. 2). Furthermore the container 31 is engaged with the seating 22 in the manner already described with reference to the injection pump. In this fitting operation the tube 28 pierces the seal 46 and places the inside of the container 31 in communication with the injection orifice 26 by way of the non-return valve 27. The chemical concentrate is them simply injected from the inside of the container 31 into the conduit 17 by depression of the piston 33. The container 31 may also be rinsed out with solution after opening of the tap 30 in the manner already described with reference to the injection pump.

In the mode of use just described the chemical concentrate container 31 may be discarded after use or alternatively may be returned to the chemical concentrate supplier for re-use.

As may be seen from FIG. 2 a flange 48 is provided on the end of the casing 32 to prevent the piston 33 from being withdrawn from the casing 32. The end of the casing 32 may be sealed off by a foil sheet (not shown) bonded around its periphery to the flange 48, which sheet will be broken or removed when the plunger 61 is fitted to the piston 33. The foil sheet provides proof against tampering and security of the stored chemical. If the container is to be reused, it will obviously be necessary for the supplier to fit a new foil sheet, as well as a new seal 46 to the outlet 35.

Although not specifically illustrated in FIG. 2, the metering device 16 is also capable of being modified for use in a third mode of operation in which the chemical concentrate is supplied in the form of a powder, rather than a liquid as is more usually the case. In this mode a hopper charged with the powder has an outlet which is threaded into a screwthreaded bore extending through an upper surface of the conduit 17 and opening into the inside of the conduit. On opening of an outlet valve, the chemical concentrate powder is introduced into the conduit 17 under the action of gravity, and in addition solution may be introduced from the conduit 17 into the hopper in order to rinse out the hopper by connecting a rinsing pipe between the dry break coupling 38 and the hopper and subsequently opening the tap 30.

Figure 3:
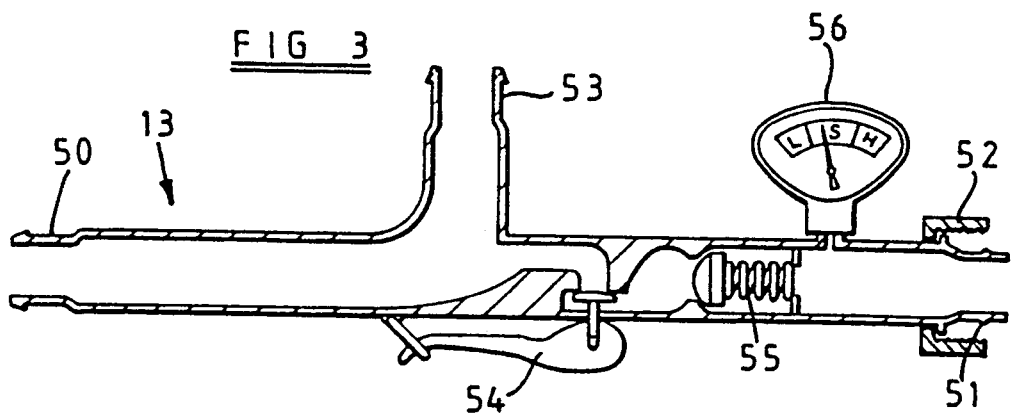
FIG. 3 is a section through a diverter of the system.

The diverter 13 shown in FIG. 3 comprises an inlet 50, an outlet 51 for connection to the inlet 18 of the conduit 17 by means of a screwthreaded bush 52, and an outlet 53 for connection to the return line 14. Furthermore the diverter 13 includes an on/off cam-operated tap 54, a non-return valve 55 and a pressure gauge 56. The tap 54 may be operated to cause the circulating solution to flow through the metering device 16 or to short-circuit the metering device 16 by diverting the circulating solution back to the reservoir 2 by way of the return line 14. The pressure gauge 56 indicates when the pressure in the flow line is at a safe level for mixing to take place.

Figure 5:
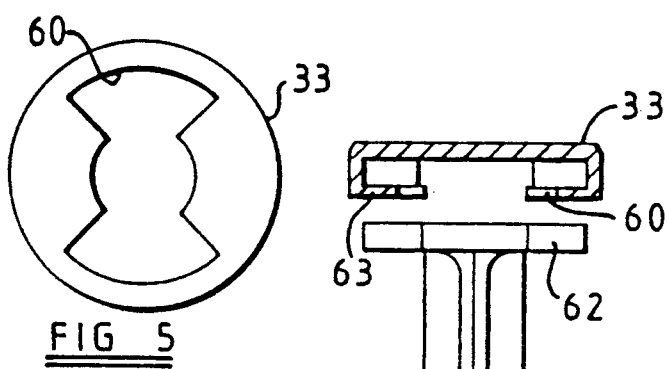
FIG. 5 is an end view of a piston of the chemical concentrate container.
Figure 6:
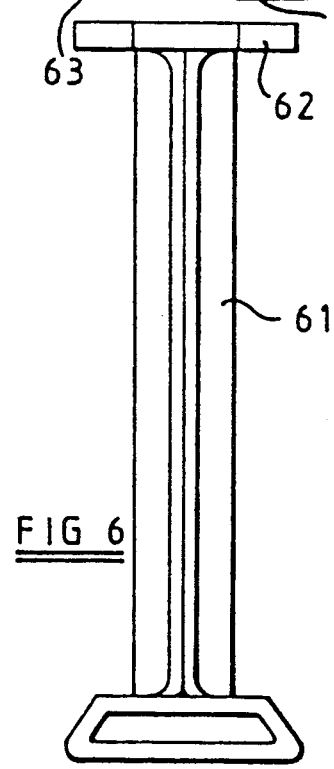
FIG. 6 shows a section through the piston and a side view of a plunger attachable to the piston.

FIG. 5 shows a slot 60 in the end of the piston 33 of the injection pump or chemical concentrate container for engagement with a detachable plunger. FIG. 6 shows the form of the plunger 61 which has an end 62 having a shape matching the shape of the slot 60. The plunger 61 is engaged with the piston 33 by inserting the end 62 into the slot 60 and turning the plunger 61 about its axis relative to the piston 33 so that the part 62 engages beneath the flange 63. The plunger 61 may then be used for moving the piston 33 in both directions within the casing 32. After use, the plunger 61 can be detached for use with a further container or for storage.

Figure 7:
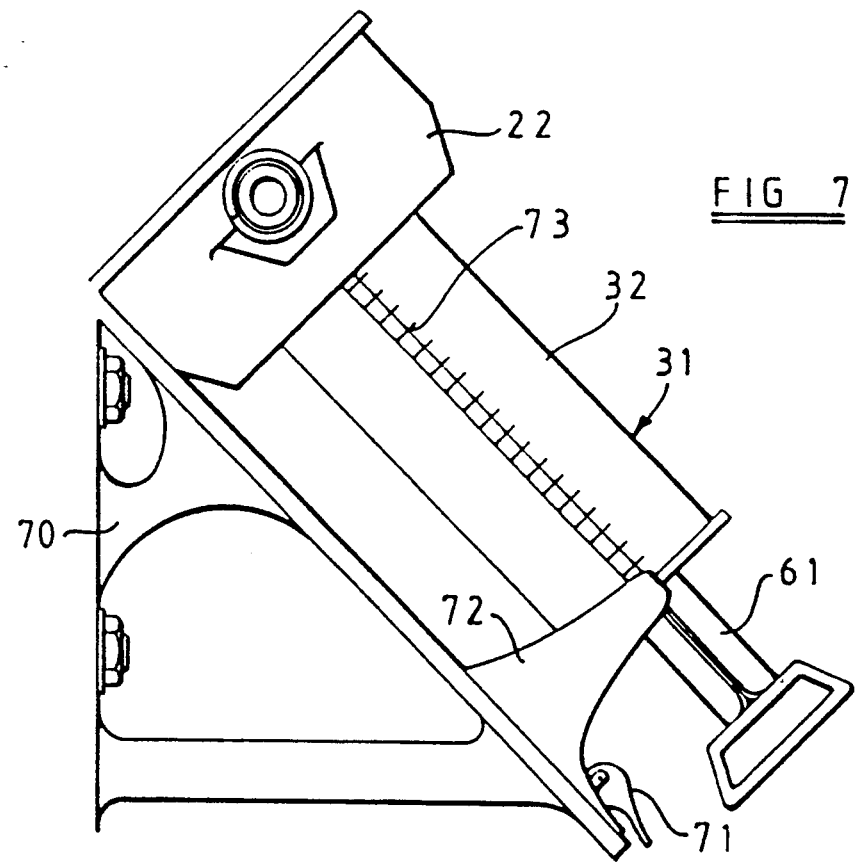
FIG. 7 is a side view of a chemical concentrate container attached to the metering device.

FIG. 7 shows a mounting arrangement for a chemical concentrate container 31 when locked in the seating 22. Such a mounting arrangement allows introduction of the chemical concentrate container 31 at a suitable angle and at a suitable height for convenient operation of the plunger 61 by the user, and preferably at a level which is below the level of solution stored in the reservoir 2. The inclination of the container 31 also ensures that chemical concentrate does not leak from the outlet of the container 31 if the container 31 is disengaged from the seating 22 whilst still partially filled with chemical concentrate. The mounting arrangement comprises an inclined bracket 70 and a cam lock 71 which may be used to lock a slidable support 72 in a position in which the support 72 supports the end of the container 31 remote from the end which is engaged with the seating 22. A metering scale 73 is provided on the casing 32, which is preferably transparent, for metering the chemical concentrate dispensed. Where the casing 32 is not transparent, a metering scale may be provided on the plunger 61.

Figure 8:
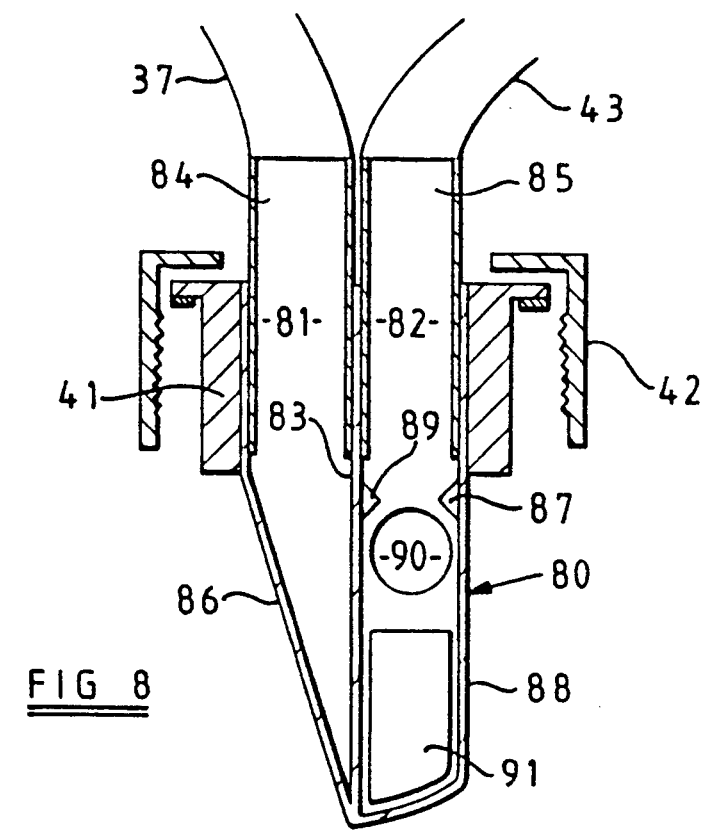
FIG. 8 is a section through a variant of a part of FIG. 4.

As will be seen in FIG. 4, in the case in which the chemical concentrate is supplied from a conventional container 31 by way of a flexible hose 37, the container 39 is inverted to assist emptying of the container 39. FIG. 8 shows a specially adapted valve assembly 80 for fitting into the outlet of the container 39 to assist in supply of chemical concentrate from the container 39 in the inverted position. The valve assembly 80 extends through a circular aperture in the bung 41 which is inserted in the outlet of the container and held therein by the screwthreaded cap 42. The assembly 80 comprises two semi-circular conduits 81 and 82 separated by a wall 83 and connectable to the flexible hose 37 and the container pressure balance tube 43 by connecting tubes 84 and 85 respectively. The conduit 81 opens into the inside of the container by way of a perforated wall 86, and the conduit 82 opens into the inside of the container by way of a ball valve 87 and a perforated wall 88. The ball valve 87 comprises a seating 89 and a ball 90, and in addition a float 91 is displaceable within the conduit 82.

In use, chemical concentrate may flow from the inside of the container to the flexible hose 37 by way of the conduit 81. Furthermore, due to the resulting reduction in the internal pressure of the container, the ball 90, which tends to close off the valve 87 when the container is in the inverted position, is lifted so as to allow air to enter the container. If any of the chemical concentrate should escape past the valve 87 into the tube 43, it will be retained in the tube 43 provided that the tube 43 extends to a height greater than the level of the chemical concentrate within the container. When the container has been emptied and is returned to its upright position, the ball 90 will drop to open the valve 87 and will rest on the seat 91. If the container is then filled with solution for rinsing by the hose 37, the valve 87 will permit escape of air as the container fills, but, when the level of solution in the container reaches the height of the float 91, the float 91 will be lifted so as to move the ball 90 into contact with the seat 89 and close off the valve 87.

The above-described chemical concentrate metering device can be incorporated in an existing conventional sprayer system by simple modification, or alternatively it can be incorporated in new sprayer equipment during manufacture.

Although not specifically shown in the drawings, it is also contemplated within the scope of the invention that the chemical metering device can be used in conjunction with a microprocessor based control system to inject chemical concentrate directly into a flow of dilutant immediately prior to the solution being supplied to a spray head. In this case, the control system could be arranged to meter the chemical concentrate supply to a required datum in dependence on the speed of a vehicle to which the sprayer system is attached. In addition systems are contemplated within the scope of the invention in which the chemical is supplied by the metering device to the spray head without first being mixed with a dilutant.

It will be appreciated that the above-described metering arrangements are particularly advantageous in operation since they achieve the objects of effectively isolating the operator and the environment from dangerous chemicals, such as concentrated pesticides, of accurately metering the chemical without applying suction, and of enabling the container in which the chemical is supplied to be quickly and simply washed out without removing it from the device and without requiring a separate water supply. The washings are returned to the sprayer system without exposing the operator or the environment to any risk of splash from either concentrates or dilute solutions.

Although the above described devices and fittings are described solely with reference to agricultural or horticultural sprayer systems, it is also within the scope of the invention to provide such devices or fittings in other applications in which a chemical is to be supplied to a chemical handling system, such as a food or chemical processing system or a chemical waste disposal system.

I claim:

1. A chemical container in combination with a chemical supply device for a chemical handling system, the supply device including a conduit for supplying a quantity of chemical to the system, a bayonet connector seating for the container and an injection orifice opening into the conduit, wherein the chemical container comprises a cylindrical casing for containing a quantity of chemical, the casing having at one end a bayonet connector adapted to be detachably received in the bayonet connector seating of the supply device and being closed at the other end, a neck at said one end of the casing defining an outlet, the supply device including a duct that communicates with the injection orifice and is adapted sealingly to enter the neck so that, when the casing is received in the seating, the neck surrounds the duct and the outlet is in sealed communication with the injection orifice opening into the conduit of the supply device, and an actuator which is a plunger slidable in the casing and which is actuable to force a quantity of the chemical from within the casing through the outlet into the conduit by way of the injection orifice.

2. A container according to claim 1 wherein the container includes a piston which is axially movable within the casing, and the actuator comprises a plunger which is displacable to move the piston axially within the casing to force a quantity of chemical through the outlet.

3. A container according to claim 2 wherein the plunger is detachable from the container.

4. A container according to claim 1 wherein the bayonet connector on the seating comprises slots on the inside of the seating, and wherein the bayonet connector at said one end of the casing comprises two pins projecting outwardly of the cylindrical surface of the casing and engagable within the slots on the inside of the seating.

5. A chemical supply device for a chemical handling system, wherein a receptacle is detachably engageable with the supply device, and wherein the supply device includes a conduit for supplying a quantity of chemical to the system, an injection orifice opening into the conduit, and a seating for detachably receiving the receptacle from which a quantity of chemical is to be supplied to the system, a duct having a passageway therethrough placing the inside of the receptacle in sealed one-way communication with the injection orifice when the receptacle is received in the seating so as to enable a quantity of chemical to be injected from the receptacle along said passageway and into the conduit by way of the injection orifice, and a rinsing pipe opening into the duct so as to enable rinsing fluid to be supplied to the receptacle by way of the rinsing pipe and the same said passageway along which said quantity of chemical has been supplied to the conduit.

6. A device according to claim 5, wherein it includes supply means by means of which a quantity of chemical may be supplied from a chemical container to the receptacle by way of the duct prior to injection from the receptacle into the conduit.

7. A device according to claim 5, wherein the conduit has an inlet for receiving dilutent from the system and an outlet for supplying a mixture of the dilutent and the supplied chemical to the system, and wherein the rinsing pipe is connected to enable flow of dilutent from the conduit into the receptacle for rinsing out the receptacle .

8. A device according to claim 5 wherein the receptacle has an outlet closed off by a seal, and wherein the duct is adapted to pierce the seal closing off the outlet of the receptacle when the receptacle is fitted to the seating to place the inside of the receptacle in communication with the injection orifice .

* * * * *